(12) United States Patent
Stephan et al.

(10) Patent No.: US 10,465,312 B2
(45) Date of Patent: Nov. 5, 2019

(54) METHOD FOR HANDLING A THREAD END AND A WINDING STATION

(71) Applicant: Rieter Ingolstadt GmbH, Ingolstadt (DE)

(72) Inventors: Adalbert Stephan, Beilngries/Paulushofen (DE); Harald Widner, Ingolstadt (DE)

(73) Assignee: Rieter Ingolstadt GmbH, Ingolstadt (DE)

( * ) Notice: Subject to any disclaimer, the term of this patent is extended or adjusted under 35 U.S.C. 154(b) by 214 days.

(21) Appl. No.: 15/588,118

(22) Filed: May 5, 2017

(65) Prior Publication Data

US 2017/0321351 A1    Nov. 9, 2017

(30) Foreign Application Priority Data

May 6, 2016    (DE) .......................... 10 2016 108 423

(51) Int. Cl.
*D01H 13/26*    (2006.01)
*D01H 4/08*    (2006.01)
(Continued)

(52) U.S. Cl.
CPC ............ *D01H 13/26* (2013.01); *B65H 67/085* (2013.01); *D01H 4/08* (2013.01); *G01L 5/04* (2013.01); *B65H 2701/31* (2013.01)

(58) Field of Classification Search
CPC ...... B65H 67/00; B65H 67/08; B65H 67/081; B65H 67/085; B65H 67/0086;
(Continued)

(56) References Cited

U.S. PATENT DOCUMENTS 2,743,877 A * 5/1956 Furst .................... B65H 63/088
139/256 A
3,165,275 A * 1/1965 Furst .................... B65H 67/081
242/487.1
(Continued)

FOREIGN PATENT DOCUMENTS

DE    15 60 367 A1    3/1971
DE    30 08 640    11/1980
(Continued)

OTHER PUBLICATIONS

EP Search Report, dated Sep. 15, 2017.
German Patent Office Search Report dated Jan. 4, 2017.

*Primary Examiner* — Shaun R Hurley
*Assistant Examiner* — Bao-Thieu L Nguyen
(74) *Attorney, Agent, or Firm* — Dority & Manning, P.A.

(57) ABSTRACT

A method, and associated textile machine winding station, are provided for handling a yarn end of a cross-wound bobbin at the winding station, wherein the cross-wound bobbin is held and driven in a bobbin holder. A thread is laid in a cross-wise manner on the cross-wound bobbin by means a traverse device. A suction nozzle having a movable suction mouth is subjected to negative pressure, and the suction mouth is moved relative to the suction nozzle such that a distance between the suction mouth and the cross-wound bobbin is changed in order to find the thread end on the cross-wound bobbin and to suck the thread end into the suction nozzle, or to stretch the thread end sucked into the suction nozzle between the suction mouth and the cross-wound bobbin. The stretched thread is moved to a unit of the textile machine for further processing.

14 Claims, 5 Drawing Sheets

(51) Int. Cl.
*G01L 5/04* (2006.01)
*B65H 67/08* (2006.01)

(58) Field of Classification Search
CPC ...... B65H 67/087; D01H 13/26; A01H 15/00; A01H 15/002; A01H 15/013
USPC .............................. 242/475.1–475.9; 57/261
See application file for complete search history.

(56) References Cited

U.S. PATENT DOCUMENTS

| | | | | |
|---|---|---|---|---|
| 3,490,709 A | | 1/1970 | Siegenthaler | |
| 3,950,925 A | * | 4/1976 | Igel | D01H 15/00 57/261 |
| 4,267,983 A | | 5/1981 | Leu | |
| 4,535,945 A | * | 8/1985 | Rohner | B65H 67/081 242/475.1 |
| 4,662,167 A | * | 5/1987 | Stahlecker | D01H 5/60 15/256.52 |
| 4,787,566 A | * | 11/1988 | Oellers | B65H 67/081 242/475.1 |
| 4,844,358 A | * | 7/1989 | Kamp | B65H 54/72 242/475.1 |
| 4,982,563 A | * | 1/1991 | Stahlecker | D01H 9/008 19/0.25 |
| 4,995,229 A | * | 2/1991 | Stahlecker | B65H 54/026 57/261 |
| 4,996,747 A | * | 3/1991 | Wichtermann | D01G 19/08 19/115 R |
| 5,022,222 A | * | 6/1991 | Rupert | B65H 65/00 57/263 |
| 5,027,475 A | * | 7/1991 | Mondini | D01G 19/08 19/115 R |
| 5,038,441 A | * | 8/1991 | Mondini | D01G 19/08 19/115 R |
| 5,082,194 A | * | 1/1992 | Greksch | B65H 63/00 242/475.1 |
| 5,111,648 A | * | 5/1992 | Isoard | D01H 15/00 57/261 |
| 5,293,738 A | * | 3/1994 | Ferro | B65H 67/085 57/261 |
| 5,301,886 A | * | 4/1994 | Kathke | B65H 63/06 242/475.6 |
| 5,303,453 A | * | 4/1994 | Langel | D01G 19/08 19/115 R |
| 5,337,456 A | * | 8/1994 | Clement | B65H 67/08 19/115 R |
| 5,426,929 A | * | 6/1995 | Schwalm | B65H 54/26 242/473.8 |
| 5,430,917 A | * | 7/1995 | Inagaki | D01G 19/08 19/115 R |
| 5,484,116 A | * | 1/1996 | Horak | B65H 67/02 242/475.6 |
| 5,494,231 A | * | 2/1996 | Hermanns | B65H 67/083 242/562.1 |
| 5,605,296 A | * | 2/1997 | Haasen | B65H 54/707 242/475.5 |
| 5,651,507 A | * | 7/1997 | Ruskens | B65H 67/02 242/475.6 |
| 5,862,660 A | * | 1/1999 | Haasen | B65H 63/06 242/475.1 |
| 5,871,168 A | * | 2/1999 | Ruskens | B65H 67/02 242/474.2 |
| 5,950,957 A | * | 9/1999 | Stiller | B65H 67/085 242/475.5 |
| 6,298,647 B1 | * | 10/2001 | Ruskens | B65H 67/081 57/22 |
| 6,804,945 B2 | * | 10/2004 | Straaten | B65H 54/71 242/475.6 |
| 8,915,055 B2 | * | 12/2014 | Stephan | D01H 1/24 57/261 |
| 2002/0023982 A1 | * | 2/2002 | Kargel | B65H 54/88 242/475.5 |
| 2003/0029155 A1 | * | 2/2003 | Straaten | B65H 54/71 57/404 |
| 2006/0230739 A1 | * | 10/2006 | Badiali | B65H 54/26 57/281 |
| 2016/0355954 A1 | * | 12/2016 | Pohn | B65H 54/26 |
| 2017/0029234 A1 | * | 2/2017 | Maleck | B65H 54/28 |
| 2017/0029235 A1 | * | 2/2017 | Maleck | D01H 4/50 |

FOREIGN PATENT DOCUMENTS

| | | |
|---|---|---|
| DE | 40 04 028 A1 | 8/1991 |
| DE | 10 2012 016854 A1 | 2/2014 |
| DE | 10 2014 009 203 A1 | 12/2015 |
| EP | 1 717 183 A1 | 11/2006 |
| EP | 2 444 347 A2 | 4/2012 |
| GB | 1123698 | 8/1968 |
| JP | S 5931256 A | 2/1984 |

* cited by examiner

METHOD FOR HANDLING A THREAD END AND A WINDING STATION

FIELD OF THE INVENTION

The present invention relates to a method for handling a thread end of a cross-wound bobbin at a winding station of a textile machine producing a cross-wound bobbin, whereas the cross-wound bobbin can be held and driven in a bobbin holder. A thread is laid in a crosswise manner on the cross-wound bobbin by means of a traversing device. A suction nozzle is subjected to negative pressure and the thread end is sucked into the suction nozzle through a suction mouth.

In addition, the invention relates to a winding station of a textile machine producing cross-wound bobbins, comprising a bobbin holder for holding a cross-wound bobbin, a traversing device for the crosswise laying of a thread on the cross-wound bobbin and a suction nozzle subjected to negative pressure with a suction mouth for sucking in a thread end.

BACKGROUND

Textile machines producing cross-wound bobbins are well-known. They can be formed as spinning or winding machines. Spinning machines, for example rotor or air spinning machines, thereby produce a thread from a fiber composite. The thread produced is then wound up on a cross-wound bobbin by a winding station of the textile machine. With a winding machine, on the other hand, a thread is already present, and is rewound from a delivery coil onto a receiver coil. The receiver coil here is spooled by the winding station as a cross-wound bobbin.

Upon the operation of such a winding station, it may occur that a thread end must be found on the cross-wound bobbin. This occurs, for example, after a thread breakage or a clearer cut, that is, if a defective thread section is intentionally cut out of the thread. In such a case, the cross-wound bobbin frequently (for example, due to its inertia) cannot be stopped in time, and the thread end winds onto the cross-wound bobbin.

In order to continue the winding operation, the thread end must be found on the circumference of the cross-wound bobbin, and then connected to the subsequent thread or attached to a newly produced thread.

In many cases, the thread end is searched for with the assistance of negative pressure. Such a method and the associated device are described, for example, in European patent application EP 1 717 183 A1. There, a suction nozzle is brought into a predetermined distance from the cross-wound bobbin in two movement steps. The suction nozzle is then subjected to negative pressure and the cross-wound bobbin is rotated backwards (compared to the winding). The thread end is then sucked into the suction nozzle through a suction mouth of the suction nozzle, and is thus found.

In this example, the suction nozzle to be moved requires a high need for space. Thus, the task of the present invention is to design a thread seeking device with a lower need for space.

SUMMARY OF THE INVENTION

A task of the invention is achieved by means of a method and a winding station with the characteristics of the independent claims. Additional objects and advantages of the invention will be set forth in part in the following description, or may be obvious from the description, or may be learned through practice of the invention.

A method for handling a thread end of a cross-wound bobbin at a winding station of a textile machine producing cross-wound bobbins is proposed. Thus, the textile machine may be a winding machine or a spinning machine, for example a rotor or air spinning machine. The cross-wound bobbin can be held and driven in a bobbin holder. The type of the drive is not important in this case; thus, it may be a drive by means of a drive roller contacting the cross-wound bobbin from the outside, or, however, a drive that acts directly on the sleeve of the cross-wound bobbin. A thread is laid in a crosswise manner on the cross-wound bobbin by means of a traversing device. In the event that a thread end has to be searched for on the cross-wound bobbin, a suction nozzle is subjected to negative pressure, and the thread end is sucked into the suction nozzle through a suction mouth.

In accordance with the invention, the suction mouth is moved relative to the suction nozzle, such that the distance between the suction mouth and the cross-wound bobbin is changed, in order to be able to find the thread end and/or to be stretched between the suction mouth and the cross-wound bobbin. The change to the distance between the suction mouth and the cross-wound bobbin allows the suction mouth to come so close to the surface of the cross-wound bobbin that the thread end can be sucked with a well-dosed vacuum. By increasing the distance between the suction mouth and the cross-wound bobbin, the thread end that is found is stretched between the cross-wound bobbin and the suction mouth. The stretched thread is then moved to a unit of the textile machine for further processing. This unit may be, for example, a splice device, which connects two thread ends to each other, or a piecing device, which applies the thread end to a thread that is newly produced or is to be newly produced. Given the fact that, in this process, only the suction mouth is moved relative to the suction nozzle, and the entire suction nozzle need not be moved in relation to the cross-wound bobbin, only a small part is in motion, which results in a considerable reduction in the need for space.

Advantageously, the suction nozzle is arranged at the winding station in a manner that is essentially stationary and directly in front of the cross-wound bobbin. Given the fact that the suction nozzle is essentially stationary, it is also the case that no additional space for movements of the suction nozzle must be kept free. Due to the arrangement of the suction nozzle directly in front of the cross-wound bobbin, by means of a small movement, the suction mouth can be brought so close to the cross-wound bobbin that it can suck in the thread end with a well-dosed vacuum, which in turn is particularly gentle on the thread already laid on the cross-wound bobbin.

It is also advantageous if, after the thread end has been sucked into the suction mouth and has been stretched between the cross-wound bobbin and the suction mouth, a thread handling element is moved in between the cross-wound bobbin and the suction mouth, the stretched thread is captured, and the thread is then moved to the unit of the textile machine for further processing. Thus, the sequence of thread search for further processing can be easily automated, and a movement of the suction nozzle can be avoided, which in turn supports the low need for space. In doing so, it is particularly advantageous if the thread handling element is a thread catcher that operates reliably and is gentle on the thread.

It is also advantageous if the thread end is found on the cross-wound bobbin by means of the suction mouth of the suction nozzle. Through the suction, both the thread end and the uppermost layers of the thread located on the cross-wound bobbin are treated more gently than, for example, in the case of a mechanical thread search or a thread search by means of compressed air.

It is also advantageous if the suction mouth and/or the bobbin holder is moved between a first position for sucking in the thread end and a second position for stretching the thread end between the cross-wound bobbin and the suction mouth. In the first position, the suction mouth is relatively close to the surface of the cross-wound bobbin, such that the negative pressure can suck in the thread end. In the second position, the thread end is then stretched between the cross-wound bobbin and the suction mouth, preferably with such a distance that the thread handling element can fit between them and can capture the stretched thread, without touching the cross-wound bobbin and damaging the thread located thereon.

Furthermore, it is advantageous if the suction mouth is moved into a parking position, in particular after the stretched thread has been moved to a unit of the textile machine for further processing. In this case, the parking position can be identical to the first position or the second position, or can present a different position from the first position and the second position. The parking position is selected in such a manner that the suction mouth, if it is in the parking position, hinders other parts of the winding station, for example the traversing device, as little as possible. Given the fact that, if the suction nozzle is no longer needed (which is the case, for example after the movement of the thread to the unit of the textile machine has taken place), the suction mouth is then moved into the parking position, which thus keeps as low as possible any hindrance of other parts of the winding station.

Advantageously, the suction mouth is moved in such a manner that it is rotated and/or displaced, in particular around the suction nozzle. Such movements can be easily realized, and thus enable a large movement framework of the suction mouth. They are also space-saving and cost-effective.

It is also advantageous if the cross-wound bobbin is lifted for stretching the thread end between the cross-wound bobbin and the suction mouth. Through this movement of the cross-wound bobbin, the thread is stretched in a well-defined manner, and the thread handling element can easily capture it.

Furthermore, it is advantageous if, for finding the thread end and/or for stretching the thread, the distance between the suction mouth and the cross-wound bobbin is changed. In order to find the thread end, it is specifically best if the suction mouth is only barely above the surface of the cross-wound bobbin, such that the thread end can be easily sucked in by the negative pressure. In order to stretch the thread, on the other hand, the distance from the suction mouth to the surface of the cross bobbin should at least be so great that the thread handling element can capture the thread without touching the suction mouth or the surface of the cross-wound bobbin.

Finally, it is advantageous if the thread is moved to a unit of the textile machine for further processing by means of a movement of the suction mouth. Thus, the suction mouth is simultaneously also the thread handling element, which saves both costs and space. Furthermore, the provided movement of the suction mouth is utilized with greater versatility.

The method is carried out according to the preceding description, whereas the specified features can be carried out individually or in any desired combination.

Furthermore, a winding station of a textile machine producing cross-wound bobbins, with a bobbin holder for holding a cross-wound bobbin, a traversing device for the crosswise laying of a thread on the cross-wound bobbin and a suction nozzle that can be subjected to negative pressure with a suction mouth for sucking in a thread end, is proposed.

In accordance with the invention, the suction nozzle features a suction mouth arranged in a movable manner on the suction nozzle, in order to be able to find the thread end and/or to stretch it between the suction mouth and the cross-wound bobbin. In addition, a thread handling element is provided, in order to be able to move the stretched thread to a unit of the textile machine for further processing. The movable suction mouth enables a space-saving design and allows the thread end to be found with precision. In order to then further process the thread end (for example, to splice it—thus, to connect it to a second thread end) or to piece it up to the outlet of a spinning unit, a thread handling element is the suitable means.

Advantageously, the suction nozzle is arranged at the winding station in a manner that is essentially stationary and directly in front of the cross-wound bobbin. Through the stationary arrangement, the costs and space of motion mechanics are saved. So that the suction mouth easily comes to the surface of the cross-wound bobbin, where it is intended to suck in the thread end, an arrangement of the suction nozzle immediately in front of the cross-wound bobbin is the best solution.

It is also advantageous if the suction mouth and/or the bobbin holder is formed in such a manner that it can be moved between a first position for sucking in the thread end and a second position for stretching the thread end between the cross-wound bobbin and the suction mouth. This enables, in the first position, a small distance between the suction mouth and the cross-wound bobbin, which is ideally suited to sucking in the thread end, and, in the second position, a certain distance between the suction mouth and the cross-wound bobbin, which enables the thread handling element to capture the thread end.

Advantageously, the suction mouth is movable into a parking position. Herein, the parking position is identical to the first position or the second position, or represents a position that is different from the first position and the second position. It is selected such that the suction mouth, if it is found in the parking position, impedes as little as possible other parts of the winding station, for example the traversing device. This enables a problem-free winding operation.

It is advantageous if the thread handling element for moving the thread to the unit is a thread catcher and/or the suction mouth. In the case of the thread catcher, which captures the thread end, for example, with negative pressure or by clamping, there is a high degree of freedom of movement. If, on the other hand, the thread handling element is the suction mouth, the freedom of movement is smaller, but a separate element can be dispensed with.

Advantageously, the suction mouth is rotatable and/or displaceable with respect to the suction nozzle. Both cases are mechanically robust and easy to construct, and at the same time enable a good movement of the suction mouth.

Finally, it is also advantageous if the cross-wound bobbin can be lifted for stretching the thread between the cross-wound bobbin and the suction mouth. By lifting the cross-wound bobbin, when the thread is stretched, the suction mouth remains at a fixed position, and the thread handling element can capture the stretched thread without any difficulty.

The device is formed according to the preceding description, whereas the specified characteristics can be present individually or in any desired combination.

BRIEF DESCRIPTION OF THE DRAWINGS

Further advantages of the invention are described in the following embodiments. The following is shown:

FIG. 1b is an additional schematic side view of the winding station from FIG. 1a;

FIG. 2b is an additional schematic side view of the winding station from FIG. 2a;

FIG. 3b is an additional schematic side view of the winding station from FIG. 3a;

DETAILED DESCRIPTION

Figure 1A:
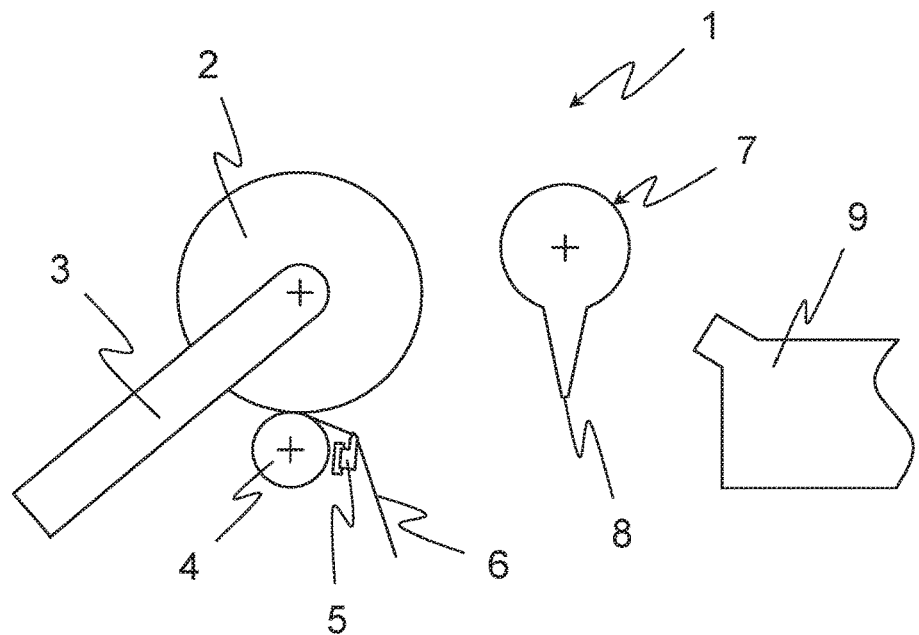
FIG. 1a is a schematic side view of a winding station of a textile machine producing cross-wound bobbins.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1a shows a schematic side view of a winding station 1 of a textile machine producing cross-wound bobbins. Herein, the textile machine may be a winding or a spinning machine, for example a rotor or air spinning machine. A cross-wound bobbin 2 is held in a bobbin holder 3 and is driven by a drive roller 4. However, within the scope of the invention, it would also be possible to drive the bobbin 2 directly with a sleeve in the bobbin holder 3. Herein, a traversing device 5 lays a thread 6 in a crosswise manner on the cross-wound bobbin 2. Here, the thread 6 comes either from a delivery coil or from a spinning unit (both not shown here). An essentially stationary suction nozzle 7 with suction mouth 8 is not used in this illustration, and is located in a parking position. Likewise, a unit 9 of the textile machine shown here (for example, a splice device), which can connect two thread ends to each other, or a piecing device, which can piece up a thread end to a thread that is newly produced or is to be newly produced, is not used.

The suction nozzle 7 and the unit 9 are only used if the normal winding or spinning operation has been interrupted, for example by a thread breakage (thus, a tearing of the thread 6), or a clearer cut (thus, a deliberate cutting out of a faulty section of the thread 6). In such cases, the thread end winds on the cross-wound bobbin 2, since, due to its inertia, the cross-wound bobbin 2 cannot be decelerated fast enough. In such a case, the wound thread end is searched for, found and then further processed.

Figure 1B:
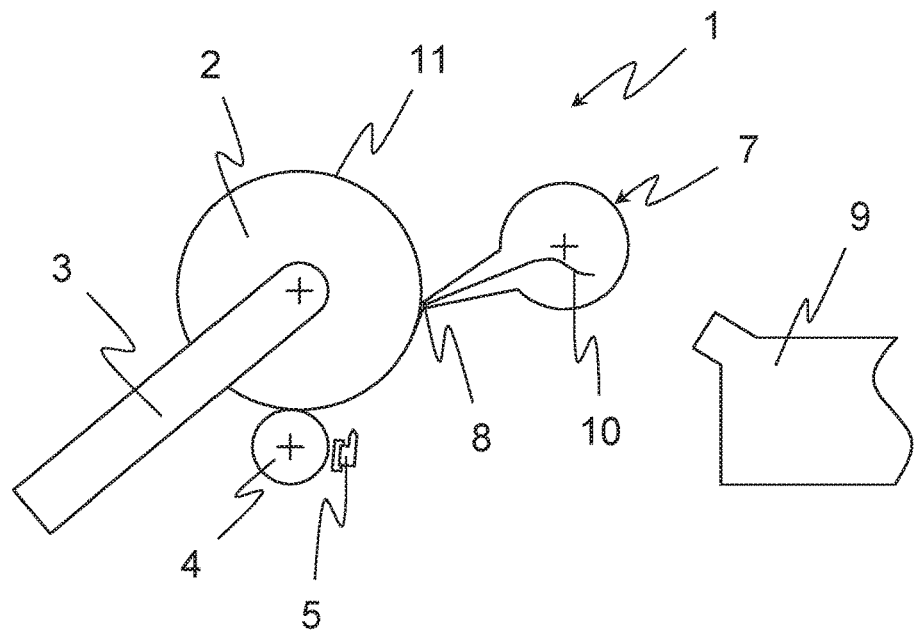

The searching for and finding of the thread end 10 is illustrated in FIG. 1b. For searching for the thread end 10, the suction mouth 8 is rotated around the suction nozzle 7 until the suction mouth 8 is located just above the surface 11 of the cross-wound bobbin 2. Subsequently, the suction nozzle 7 is subjected to negative pressure, and the cross-wound bobbin 2 is slowly rotated counter to the direction of rotation in the winding operation. This is carried out until the thread end 10 is located on the surface 11 of the cross-wound bobbin 2 and is sucked into the suction nozzle 7 through the suction mouth 8.

Figure 1C:
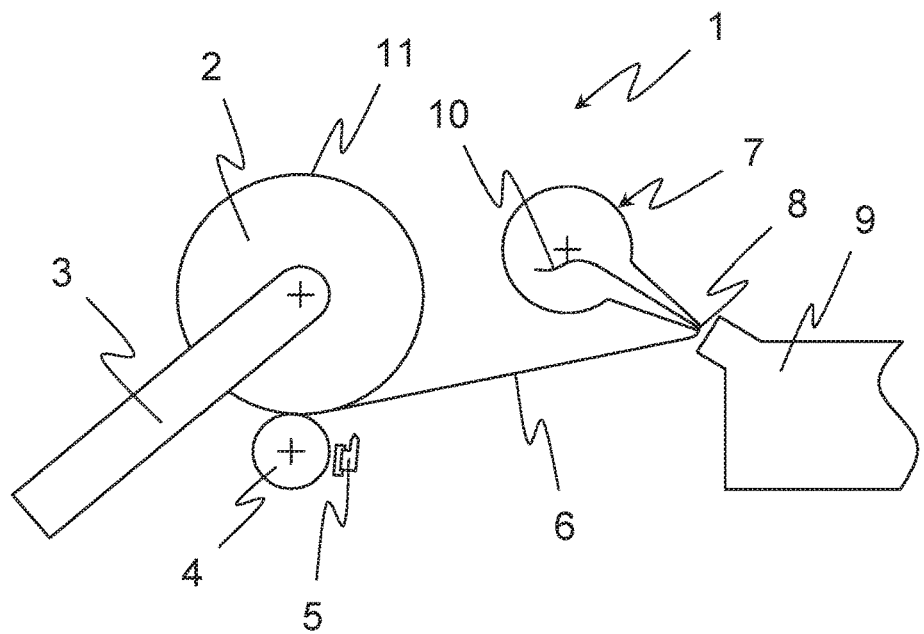
FIG. 1c is an additional schematic side view of the winding station from FIGS. 1a and 1b.

The next step is shown in FIG. 1c. After the suction nozzle 7 has sucked in the thread end 10, the suction mouth 8 is in turn rotated around the suction nozzle 7. The suction mouth 8 is in this case rotated until it has moved the thread 6 to the unit 9. At that point, the unit 9 accepts the thread end 10 and continues to process it, for example, by connecting the thread end 10 with an additional thread end or by piecing up the thread end 10 to thread that is newly produced or is to be newly produced. The suction mouth 8 is then moved back into the parking position, the thread 6 is again threaded into the traversing device 5, and the spinning or winding operation is continued.

In the following description of the alternative embodiment shown in FIG. 2a, the same reference signs are used for characteristics that are identical and/or at least comparable in their designs and/or modes of action in comparison to the first embodiment shown in FIGS. 1a, 1b and 1c. To the extent that such are not described once again in detail, their designs and/or modes of action correspond to the designs and modes of action of the characteristics described above.

Figure 2A:
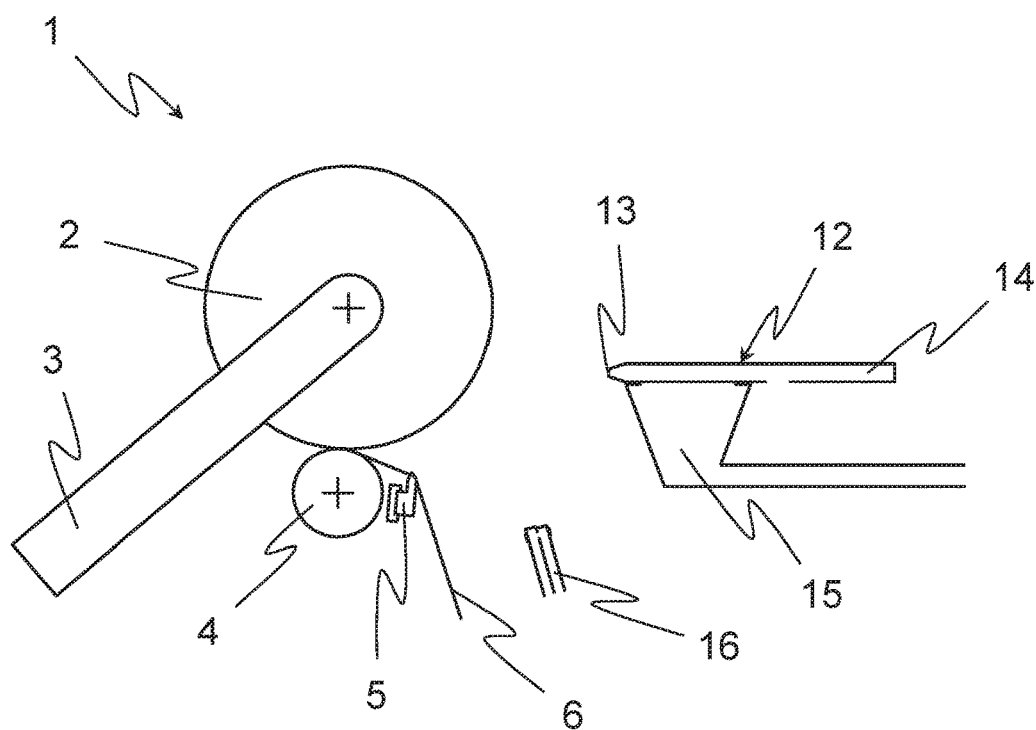
FIG. 2a is a schematic side view of an additional winding station of a textile machine producing cross-wound bobbins.

In the embodiment shown in FIG. 2a, in comparison with the embodiment illustrated in FIGS. 1a, 1b and 1c, a suction nozzle 12 with a linearly displaceable suction mouth 13 is provided. Here, the suction mouth 13 is arranged at one end of a suction spout 14, which can be displaced in a linear manner with respect to the stationary base body 15 of the suction nozzle 12. Here, the suction nozzle 12 is located in a parking position, as is a pneumatic thread catcher 16.

Figure 2B:
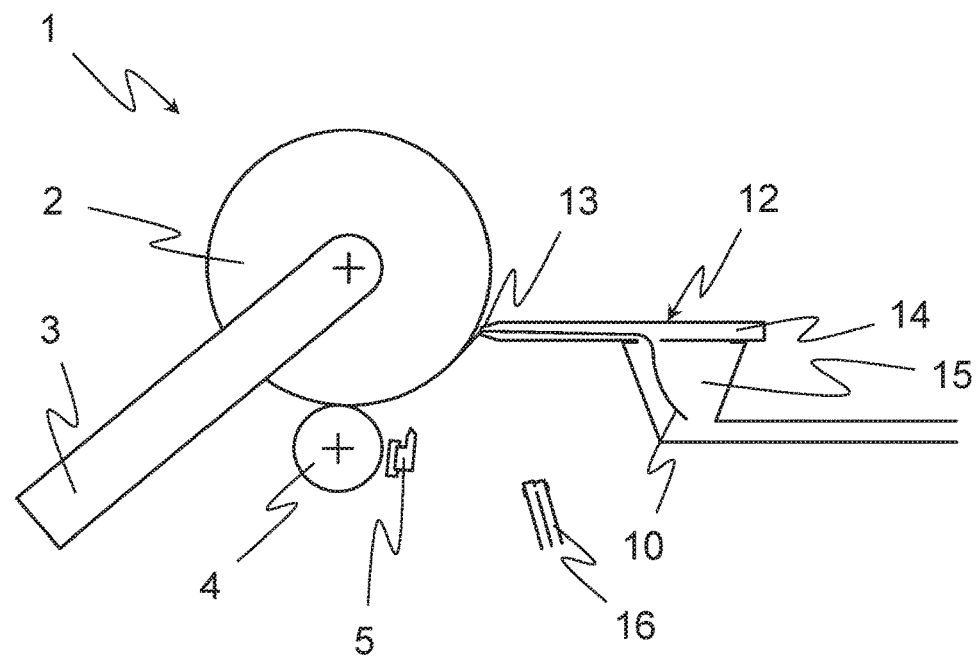

The search for a thread end 10 on the surface 11 of the cross-wound bobbin 2 is shown in FIG. 2b. For this purpose, the suction spout 14 is displaced in the direction of the cross-wound bobbin 2, until the suction mouth 13 is located just above the surface 11 of the cross-wound bobbin 2. Subsequently, the suction nozzle 12 is subjected to negative pressure, and the cross-wound bobbin 2 is rotated counter to the direction of rotation in winding operation, until the thread end 10 is sucked into the suction spout 14 through the suction mouth 13.

Figure 2C:
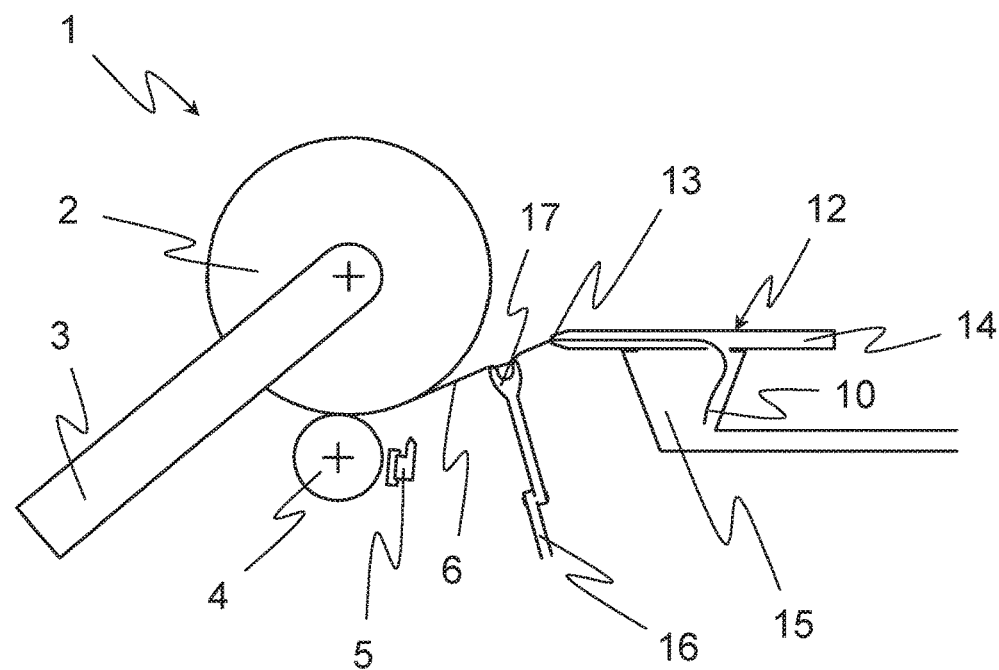
FIG. 2c is an additional schematic side view of the winding station from FIGS. 2a and 2b.

The additional method is shown in FIG. 2c. In order to further process the thread 6, the suction spout 14, together with the suction mouth 13, is displaced away from the cross-wound bobbin 2, such that the thread 6 is stretched between the cross-wound bobbin 2 and the suction mouth 13. A catching nozzle 17 of the pneumatic thread catcher 16 is now moved into the vicinity of the stretched thread 6. The catching nozzle 17 is subjected to negative pressure, such that the stretched thread 6 is sucked in by the catching nozzle 17. The thread 6 thus captured by the pneumatic thread catcher 16 is then moved with the assistance of the catching nozzle 17 for further processing to a unit (not shown here), for example a splice device or a piecing device. The suction mouth 13 and the catching nozzle 17 are then moved back into the parking position, the thread 6 is once again threaded into the traversing device 5, and the spinning or winding operation is continued.

Figure 3A:
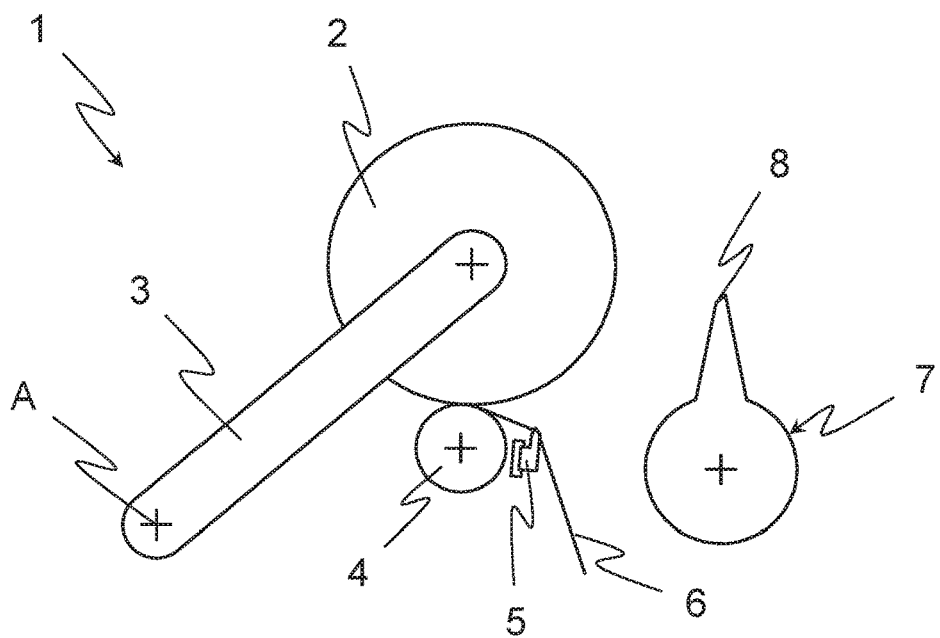
FIG. 3a is a schematic side view of an additional winding station of a textile machine producing cross-wound bobbins.

In the following description of the alternative embodiment shown in FIG. 3a, the same reference signs are used for characteristics that are identical and/or at least comparable in their designs and/or modes of action in comparison to the first or second embodiment, as the case may be, shown in FIGS. 1a, 1b and 1c along with 2a, 2b and 2c. To the extent that such are not described once again in detail, their designs and/or modes of action correspond to the designs and modes of action of the characteristics described above.

With the embodiment shown in FIG. 3 a, the bobbin holder 3 is rotatably mounted around an axis A, such that the position of the cross-wound bobbin 2 can be changed. In this illustration, the suction nozzle 7 is shown in a parking position.

Figure 3B:
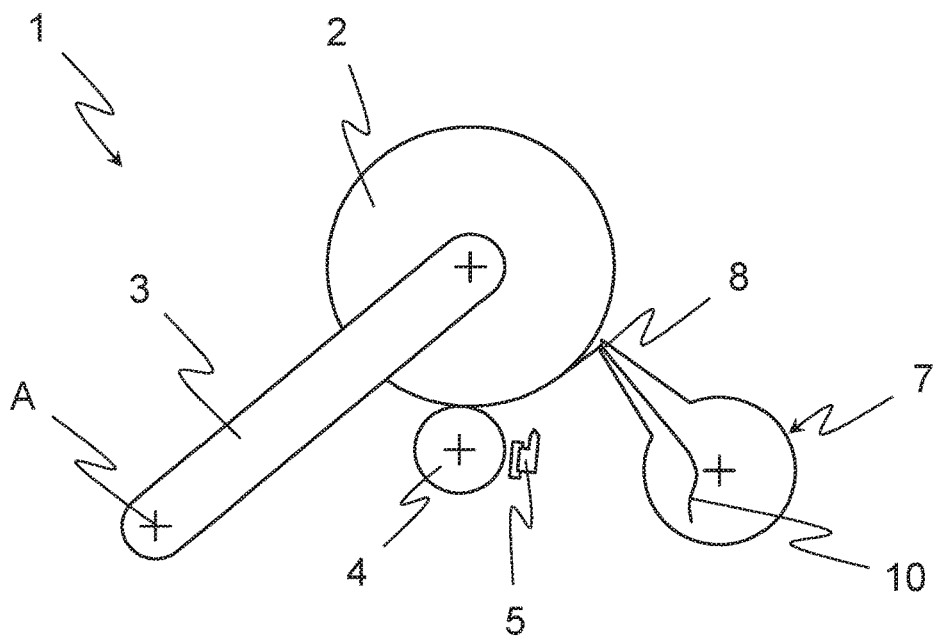

FIG. 3b shows the winding station 1 after a thread breakage or a clearer cut. The suction mouth 8 is rotated around the suction nozzle 7 and is subjected to negative pressure. At the same time, the cross-wound bobbin 2 is rotated counter to the direction of rotation in the winding operation, until the thread end 10 is sucked into the suction nozzle 7 through the suction mouth 8.

Figure 3C:
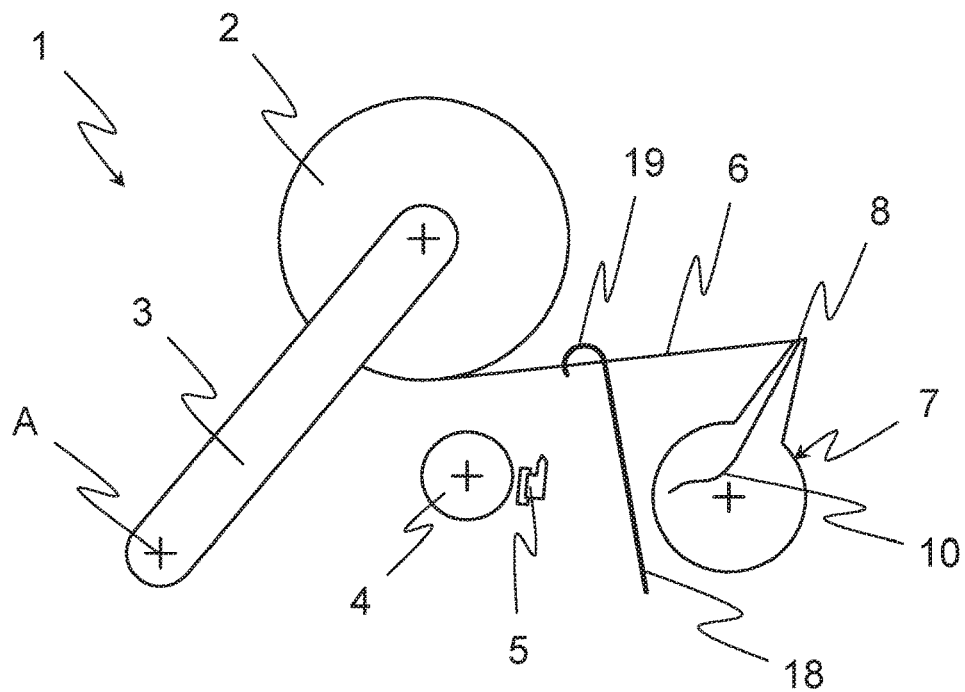
FIG. 3c is an additional schematic side view of the winding station from FIGS. 3a and 3b.

At that point, as shown in FIG. 3c, the thread 6 is stretched. For this purpose, the suction mouth 8 is rotated around the suction nozzle 7 in such a manner that it moves away from the cross-wound bobbin 2. At the same time, the bobbin holder 3, and thus the cross-wound bobbin 2, are rotated around the axis A, such that the cross-wound bobbin 2 moves away from the suction nozzle 7. The thread 6 is thus stretched between the cross-wound bobbin 2 and the suction mouth 8. A mechanical thread catcher 18 is then pivoted, whereas a catching hook 19, which is arranged at one end of the mechanical thread catcher 18, captures the thread 6.

Figure 3D:
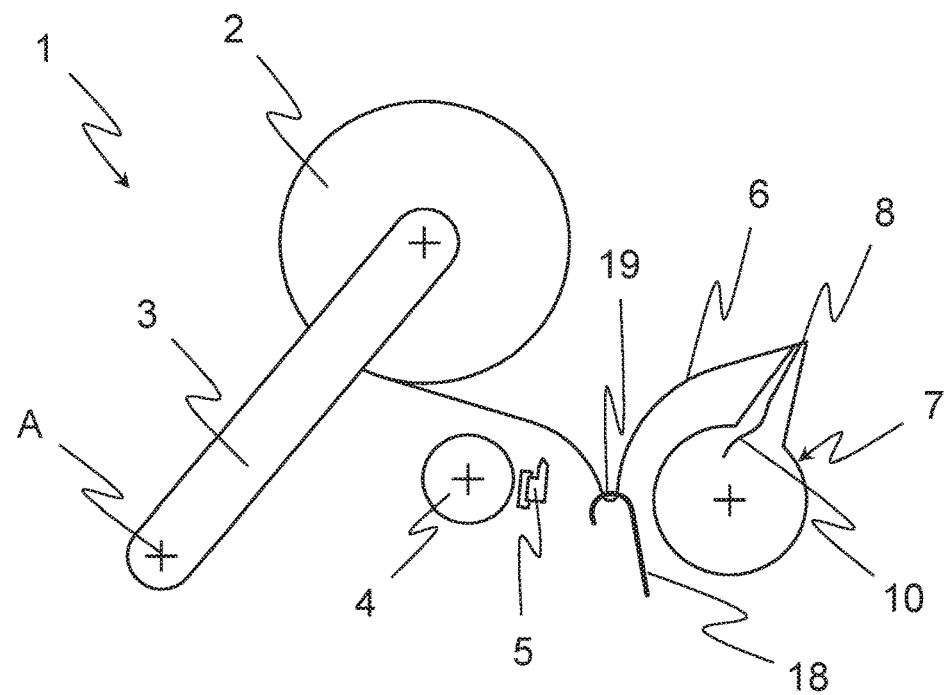
FIG. 3d is an additional schematic side view of the winding station from FIGS. 3a, 3b and 3c.

As shown in FIG. 3d, the catching hook 19 pulls the thread 6 such that the thread 6 forms a loop. Here, the thread end 10 remains in the suction nozzle 7. The thread length required for the loop is either unwound from the cross-wound bobbin 2, in particular if the cross-wound bobbin is lifted off as shown here, or is pulled off the suction nozzle 7, in particular if the cross-wound bobbin rests on the drive roller 4, as in the previously shown embodiments. In the latter case, of course, the required thread length can also be advanced into the loop by means of a targeted rewinding. The loop that is thus formed in the thread 6 is then pulled to a unit not shown here for further processing. After further processing, the suction mouth 8 is rotated back into the parking position, the thread 6 is once again threaded into the traversing device 5, and the spinning or winding operation is continued.

This invention is not limited to the illustrated and described embodiments. Variations within the scope of the claims, just as the combination of characteristics, are possible, even if they are illustrated and described in different embodiments.

LIST OF REFERENCE SIGNS

1 Winding station
2 Cross-wound bobbin
3 Bobbin holder
4 Drive roller
5 Traversing device
6 Thread
7 Suction nozzle
8 Suction mouth
9 Unit
10 Thread end
11 Surface
12 Suction nozzle
13 Suction mouth
14 Suction spout
15 Base body
16 Pneumatic thread catcher
17 Catching nozzle
18 Mechanical thread catcher
19 Catching hook
A Axis

The invention claimed is:

1. A method for handling a yarn end of a cross-wound bobbin at a winding station of a textile machine that produces the cross-wound bobbins, wherein at the textile machine:
the cross-wound bobbin is held and driven in a bobbin holder;
a thread is laid in a cross-wise manner on the cross-wound bobbin by means a traverse device; and
a suction nozzle having a movable suction mouth is subjected to negative pressure;
the method comprising:
moving the suction mouth relative to the suction nozzle such that a distance between the suction mouth and the cross-wound bobbin is changed for one or both of finding the thread end on the cross-wound bobbin and sucking the thread end into the suction nozzle, or stretching the thread end sucked into the suction nozzle between the suction mouth and the cross-wound bobbin;
moving the stretched thread to a unit of the textile machine for further processing; and
wherein the suction nozzle is stationary and the suction mouth is rotated or linearly displaced relative to the suction nozzle.

2. The method according to claim 1, wherein the suction nozzle is arranged stationary in front of the cross-wound bobbin.

3. The method according to claim 1, further comprising moving a thread catcher in between the cross-wound bobbin and the suction mouth and capturing the stretched thread; and moving the thread with the thread catcher to the unit of the textile machine for further processing.

4. The method according to claim 1, wherein the thread end is found on the cross-wound bobbin by the suction mouth of the suction nozzle.

5. The method according to claim 1, wherein one or both of the suction mouth or the bobbin holder are moved between a first position for sucking in the thread end and a second position for stretching the thread end between the cross-wound bobbin and the suction mouth.

6. The method according to claim 1, wherein the suction mouth is moved into a parking position after the stretched thread has been moved to the unit of the textile machine for further processing.

7. The method according to claim 1, wherein the cross-wound bobbin is lifted for stretching the thread end between the cross-wound bobbin and the suction mouth.

8. The method according to claim 1, wherein the thread is moved to the unit of the textile machine for further processing by movement of the suction mouth.

9. A winding station of a textile machine for producing cross-wound bobbins, comprising:
a bobbin holder;

a traversing device disposed for crosswise laying of a thread on a cross-wound bobbin held by the bobbin holder;

a suction nozzle that can be subjected to negative pressure;

a suction mouth movably configured on the suction nozzle, wherein the suction mouth is movable for one or both of finding and sucking in the thread end from the cross-wound bobbin or stretching the sucked-in thread end between the suction mouth and the cross-wound bobbin;

wherein the suction nozzle is stationary and the suction mouth is rotatable or linearly displaceable relative to the suction nozzle; and a movable thread catcher that moves the stretched thread to a unit of the textile machine for further processing.

10. The winding station according to claim 9, wherein the suction nozzle is stationary and in front of the cross-wound bobbin.

11. The winding station according to claim 9, wherein one or both of the suction mouth or the bobbin holder are movable between a first position for sucking in the thread end and a second position for stretching the thread end between the cross-wound bobbin and the suction mouth.

12. The winding station according to claim 9, wherein the suction mouth is movable into a parking position.

13. The winding station according to claim 9, wherein the suction mouth is also the movable thread catcher.

14. The winding station according to claim 9, wherein the bobbin holder is liftable for stretching the thread end between the cross-wound bobbin and the suction mouth.

* * * * *